(12) United States Patent
Davydov et al.

(10) Patent No.: US 10,211,960 B2
(45) Date of Patent: *Feb. 19, 2019

(54) POWER OFFSET SIGNALING TECHNIQUES FOR NETWORK-ASSISTED INTERFERENCE CANCELLATION AND SUPPRESSION (NAICS) RECEIVERS

(71) Applicant: Intel Corporation, Santa Clara, CA (US)

(72) Inventors: Alexei Davydov, Nizhny Novgorod (RU); Gi Wan Choi, San Jose, CA (US); Alexander Maltsev, Nizhny Novgorod (RU); Gregory V. Morozov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,047

(22) Filed: Oct. 23, 2017

(65) Prior Publication Data
US 2018/0191475 A1    Jul. 5, 2018

Related U.S. Application Data

(63) Continuation of application No. 14/583,648, filed on Dec. 27, 2014, now Pat. No. 9,800,383.
(Continued)

(51) Int. Cl.
*H04L 5/00* (2006.01)
*H04B 1/10* (2006.01)
(Continued)

(52) U.S. Cl.
CPC ......... *H04L 5/0053* (2013.01); *H04B 1/1027* (2013.01); *H04L 5/0073* (2013.01);
(Continued)

(58) Field of Classification Search
USPC .......... 375/219, 220, 221, 222, 240, 240.26, 375/240.27, 257, 258, 278, 284, 285, 295,
(Continued)

(56) References Cited

U.S. PATENT DOCUMENTS

| 7,047,032 | B2 * | 5/2006 | Yun | H04L 1/0003 375/260 |
|---|---|---|---|---|
| 2002/0145985 | A1 * | 10/2002 | Love | H04L 1/1812 370/328 |

(Continued)

FOREIGN PATENT DOCUMENTS

KR    20140058356 A    5/2014

OTHER PUBLICATIONS

Office Action received for Japanese Patent Application No. JP2016-569740, dated Jan. 9, 2018, 7 pages.
(Continued)

*Primary Examiner* — Linda Wong

(57) ABSTRACT

Power offset signaling techniques for network-assisted interference cancellation and suppression (NAICS) receivers are described. In one embodiment, for example, user equipment (UE) may comprise at least one radio frequency (RF) transceiver, at least one RF antenna, and logic, at least a portion of which is in hardware, the logic to receive a radio resource control (RRC) connection control message comprising a RadioResourceConfigDedicated field and perform a radio resource configuration procedure in response to receipt of the RRC connection control message, the RRC connection control message to comprise network-assisted interference cancellation and suppression (NAICS) assistance information that identifies a power offset value for one or more transmissions to the UE over a physical downlink shared channel (PDSCH) of a serving cell of the UE. Other embodiments are described and claimed.

22 Claims, 9 Drawing Sheets

Related U.S. Application Data

(60) Provisional application No. 62/003,329, filed on May 27, 2014.

(51) Int. Cl.
| | | |
|---|---|---|
| *H04L 27/34* | (2006.01) | |
| *H04W 52/16* | (2009.01) | |
| *H04W 52/36* | (2009.01) | |
| *H04L 27/18* | (2006.01) | |

(52) U.S. Cl.
CPC ............ *H04L 27/34* (2013.01); *H04W 52/16* (2013.01); *H04W 52/36* (2013.01); *H04L 27/18* (2013.01)

(58) Field of Classification Search
USPC ....... 375/296, 297, 298, 302, 308, 315, 316, 375/322, 324, 340, 346, 354, 358, 362, 375/371
See application file for complete search history.

(56) References Cited

U.S. PATENT DOCUMENTS

| | | | | |
|---|---|---|---|---|
| 2003/0232622 | A1* | 12/2003 | Seo | H04W 52/16 455/437 |
| 2008/0285669 | A1* | 11/2008 | Walton | H04B 7/022 375/260 |
| 2010/0074131 | A1* | 3/2010 | Onggosanusi | H04L 5/00 370/252 |
| 2012/0021753 | A1 | 1/2012 | Damnjanovic et al. | |
| 2013/0163536 | A1 | 6/2013 | Anderson et al. | |
| 2013/0194950 | A1 | 8/2013 | Haghighat et al. | |
| 2013/0250879 | A1 | 9/2013 | Ng et al. | |
| 2014/0286219 | A1 | 9/2014 | Siomina et al. | |
| 2014/0328259 | A1* | 11/2014 | Nammi | H04L 1/0026 370/329 |
| 2015/0271859 | A1* | 9/2015 | Huang | H04W 72/12 370/329 |
| 2016/0134458 | A1* | 5/2016 | Xia | H04L 5/0053 370/329 |

OTHER PUBLICATIONS

"TSG RAN WG2, RAN2 agreed CRs on Core part: Network-Assisted Interference Cancellation and Suppression for LTE", 3GPP TSG-RAN#66 RP-142139, Internet, Dec. 5, 2014.
Search Report received for Taiwanese Patent Application No. 106100010, dated Nov. 20, 2017, 1 page.
Office Action received for Korean Patent Application No. 2016-7029989, dated Dec. 6, 2017, 6 pages English translation.
Intel corporation "Discussion on higher layer signaling for NAICS," 3GPP TSG-RAN WG1 Meeting #77, R1-142014 May 10, 2014, 4 pages., (Author unknown).
Intel corporation "Discussion on PDSCH interference signal parameters detection for NAICS," 3GPP TSG-RAN WG4 Meeting #70, R1-140609, Feb. 4, 2014, 14 pages, (Author unknown).
Extended European Search Report received for European Patent Application No. 15800455.6, dated Oct. 25, 2017, 11 pages.
"Discussion on higher layer signaling for NAICS", Intel Corporation, 3GPP TSG RAN WG1, Meeting #77, R1-142014, May 18, 2014, 4 pages, (author unknown).
"Higher-layer signaling for NAICS", ERICSSON, 3GPP TSG RAN WG1, Meeting #77, R1-142571, May 22, 2014, 4 pages, (author unknown).
"Discussion on PDSCH interference signal parameters detection for NAICS", Intel Corporation, 3GPP TSG RAN WG4, Meeting #70, R1-140609, Feb. 9, 2014, 14 pages, (author unknown).
"Discussion on feasibility of signaling approaches for NAICS receivers", Intel Corporation, 3GPP TSG RAN WG4, Meeting #76, R1-140138, Feb. 9, 2014, 5 pages, (author unknown).
"3rd Generation Partnership Project; Technical Specifications Group Radio Access Network; Evolved Universal Terrestrial Radio Access (E0UTRA) Physical Layer procedures (Release 12)", Intel Corporation, 3GPP TS 36.213 Mar. 19, 2014, 186 pages, (author unknown).
TSG RAN WG2, RAN2 agreed CRs on Core part Network-Assisted Interference Cancellation and Suppression for LTE, 3GPP TSG-RAN#66 RP-142139, Internet <URL:http://www.3gpp.org/ftp/tsg_ran/TSG_RAN/TSGR_66/Docs/RP-142139.ZIP>, Dec. 5, 2014.

* cited by examiner

RECEIVE RRC CONNECTION CONTROL MESSAGE COMPRISING NAICS ASSISTANCE INFORMATION IDENTIFYING POWER OFFSET VALUE FOR QPSK-MODULATED C-RNTI-BASED TRANSMISSIONS TO UE OVER PDSCH OF SERVING CELL
502

PERFORM
RADIO RESOURCE CONFIGURATION PROCEDURE IN RESPONSE TO RECEIPT OF RRC CONNECTION CONTROL MESSAGE
504

APPLY ONE OR MORE NAICS INTER-CELL INTERFERENCE MITIGATION ALGORITHMS TO ONE OR MORE TRANSMISSIONS RECEIVED OVER PDSCH OF SERVING CELL BASED ON POWER OFFSET VALUE
506

IDENTIFY ONE OR MORE POWER OFFSET VALUES TO APPLY TO DL TRANSMISSIONS OVER PDSCH
*602*

SEND MESSAGE OVER X2 INTERFACE TO REPORT THE ONE OR MORE POWER OFFSET VALUES
*604*

PERFORM DL TRANSMISSION(S) OVER PDSCH ACCORDING TO THE ONE OR MORE POWER OFFSET VALUES
*606*

FIG. 7A

Storage Medium 700

Computer Executable Instructions for 400

Computer Executable Instructions for 600

FIG. 7B

Storage Medium 750

Computer Executable Instructions for 500

*Broadband Wireless Access System*
900

POWER OFFSET SIGNALING TECHNIQUES FOR NETWORK-ASSISTED INTERFERENCE CANCELLATION AND SUPPRESSION (NAICS) RECEIVERS

RELATED CASE

This application is a continuation of, claims the benefit of, and priority to previously filed U.S. patent application Ser. No. 14/583,648 filed Dec. 27, 2014, which claims priority to U.S. Provisional Patent Application No. 62/003,329, filed May 27, 2014; both of which are hereby incorporated by reference in their entirety.

TECHNICAL FIELD

Embodiments herein generally relate to communications between devices in broadband wireless communications networks.

BACKGROUND

Network-assisted interference cancellation and suppression (NAICS) is an emerging approach to inter-cell interference mitigation. The implementation of NAICS techniques generally involves UE-side application of interference mitigation algorithms to reduce the extent to which transmissions in neighboring cells interfere with transmissions to the UE in its serving cell. Generally speaking, the more knowledge a UE has about the structure, spatial properties, and/or other characteristics of transmissions that interfere with each other, the greater its opportunity to achieve spectral efficiency gains via NAICS interference mitigation may be. The structure, spatial properties, and/or other characteristics of such transmissions may largely be determined by various network-side parameters. In order to support NAICS inter-cell interference mitigation, it may be desirable that one or more such network-side parameters be provided to the UE.

BRIEF DESCRIPTION OF THE DRAWINGS

FIG. 5 illustrates an embodiment of a second logic flow.
FIG. 6 illustrates an embodiment of a third logic flow.
FIG. 7A illustrates an embodiment of a first storage medium.
FIG. 7B illustrates an embodiment of a second storage medium.

DETAILED DESCRIPTION

Figure 1:
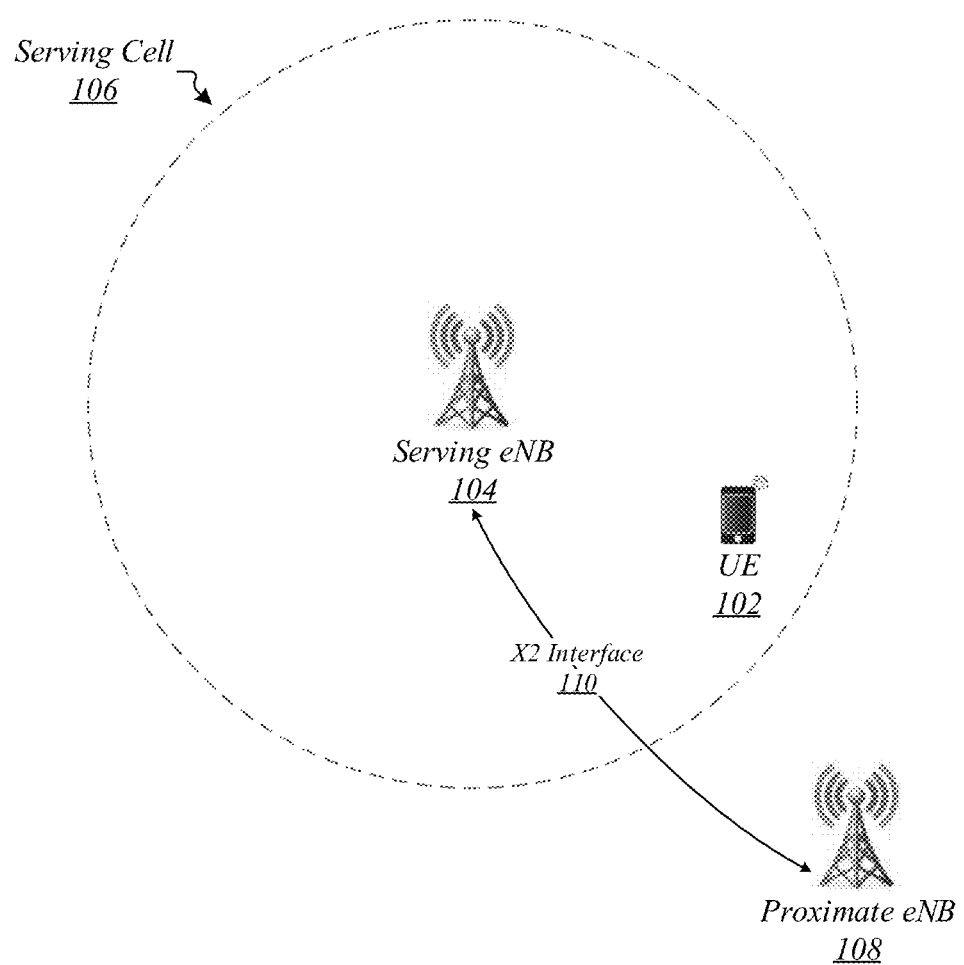
FIG. 1 illustrates an embodiment of a first operating environment.

Various embodiments may be generally directed to power offset signaling techniques for network-assisted interference cancellation and suppression (NAICS) receivers. In one embodiment, for example, user equipment (UE) may comprise at least one radio frequency (RF) transceiver, at least one RF antenna, and logic, at least a portion of which is in hardware, the logic to receive a radio resource control (RRC) connection control message comprising a RadioResourceConfigDedicated field and perform a radio resource configuration procedure in response to receipt of the RRC connection control message, the RRC connection control message to comprise network-assisted interference cancellation and suppression (NAICS) assistance information that identifies a power offset value for one or more transmissions to the UE over a physical downlink shared channel (PDSCH) of a serving cell of the UE. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their predecessors, revisions, progeny, and/or variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1xRTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/ or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

FIG. 1 illustrates an example of an operating environment 100 such as may be representative of various embodiments. In operating environment 100, a user equipment (UE) 102 is provided with wireless connectivity by a serving evolved node B (eNB) 104, which generally provides wireless service within a serving cell 106. A proximate eNB 108 serves a nearby cell (not pictured). Serving eNB 104 and proximate eNB 108 are communicatively coupled by an X2 interface connection 110. Serving eNB 104 may be operative to transmit data to UE 102 over a physical downlink shared channel (PDSCH) of serving cell 106 Likewise, proximate eNB 108 may be operative to transmit data to UEs in the nearby cell over a PDSCH of the nearby cell. The embodiments are not limited to the elements depicted in FIG. 1.

Figure 2:
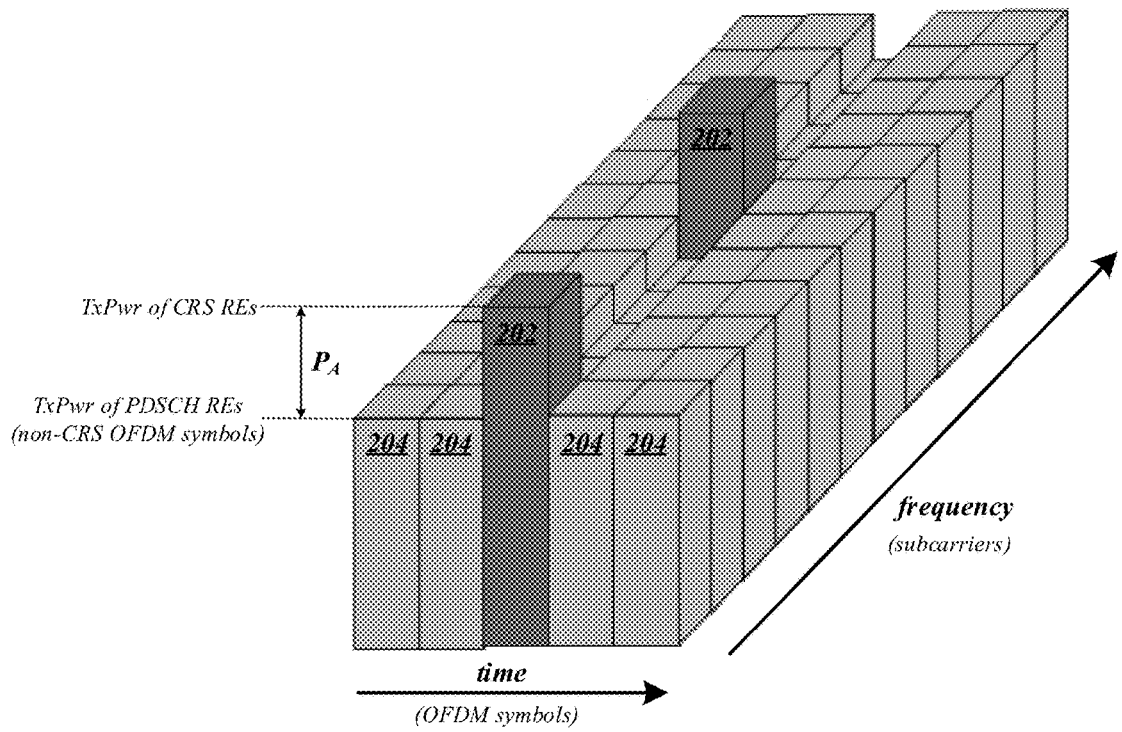
FIG. 2 illustrates an embodiment of a wireless channel.

FIG. 2 illustrates a PDSCH 200 such as may be representative of the PDSCHs over which serving eNB 104 and proximate eNB 108 of FIG. 1 may transmit data in some embodiments. More particularly, FIG. 2 illustrates the respective powers with which different types of resource elements (REs) may be transmitted over PDSCH 200. In FIG. 2, transmit powers are depicted for a block of REs that comprises five OFDM symbols in the time dimension and twelve subcarriers in the frequency dimension. The depicted height of each RE indicates the respective power with which that RE is transmitted. Two of the REs are cell-specific reference signal (CRS) REs 202, while the remaining REs are PDSCH REs 204. Hereinafter, an OFDM symbol during which CRS REs are transmitted shall be referred to as a "CRS OFDM symbol", and an OFDM symbol during which CRS REs are not transmitted shall be referred to as a "non-CRS OFDM symbol."

As shown in FIG. 2, a common power level is applied with respect to all of the PDSCH REs 204 transmitted during non-CRS OFDM symbols. Another common power level is applied with respect to transmission of CRS REs 202 and a third common power level is applied with respect to PDSCH REs 204 transmitted during CRS OFDM symbols. An eNB that transmits over PDSCH 200 may do so in accordance with a PDSCH power offset PA. As shown in FIG. 2, the PDSCH power offset PA may define a difference between— and, by extension, a ratio between—the transmit power used for CRS REs 202 and the transmit power used for PDSCH REs 204 during non-CRS OFDM symbols. The embodiments are not limited in this context.

Returning to FIG. 1, under a variety of circumstances, downlink (DL) transmissions over the PDSCH of the nearby cell may be prone to interfering with DL transmissions from serving eNB 104 to UE 102 over the PDSCH in serving cell 106. One approach to mitigating such inter-cell interference may be the application of network-assisted interference cancellation/suppression (NAICS) techniques. According to NAICS techniques, as a UE receives DL transmissions from its serving eNB, the UE may utilize various algorithms to mitigate inter-cell interference to which those DL transmissions are subject. For example, in conjunction with receiving a DL transmission from serving eNB 104 of FIG. 1, UE 102 may apply NAICS techniques to mitigate the extent to which a concurrent DL transmission by proximate eNB 108 interferes with the DL transmission from serving eNB 104. NAICS may be regarded as a "UE-side" approach, in that it involves interference mitigation that is performed by the UE.

It is worthy of note that although NAICS generally constitutes a UE-side approach, its effectiveness may be enhanced by leveraging knowledge of network-side parameters. Such network-side parameters may include parameters relating to communications in the serving cell as well as parameters relating to communications in the proximate cell. Transmission power information is one type of information that may be of significant value in conjunction with UE application of NAICS techniques. In the context of interfering PDSCH transmissions, specific knowledge of the ratio of the respective powers with which CRS REs and PDSCH REs are transmitted may enable the application of more fruitful NAICS algorithms than those that utilize mere estimates of that ratio. Since the PDSCH power offset determines the ratio between those respective powers, PDSCH power offsets are network-side parameters with respect to which knowledge of the implemented configuration(s) may be of significant value for use in NAICS. As such, in order to enhance the effectiveness of NAICS inter-cell interference mitigation in any particular cell, it may be desirable that the serving eNB be configured to report PDSCH power offset information to UEs that it serves.

Figure 3:
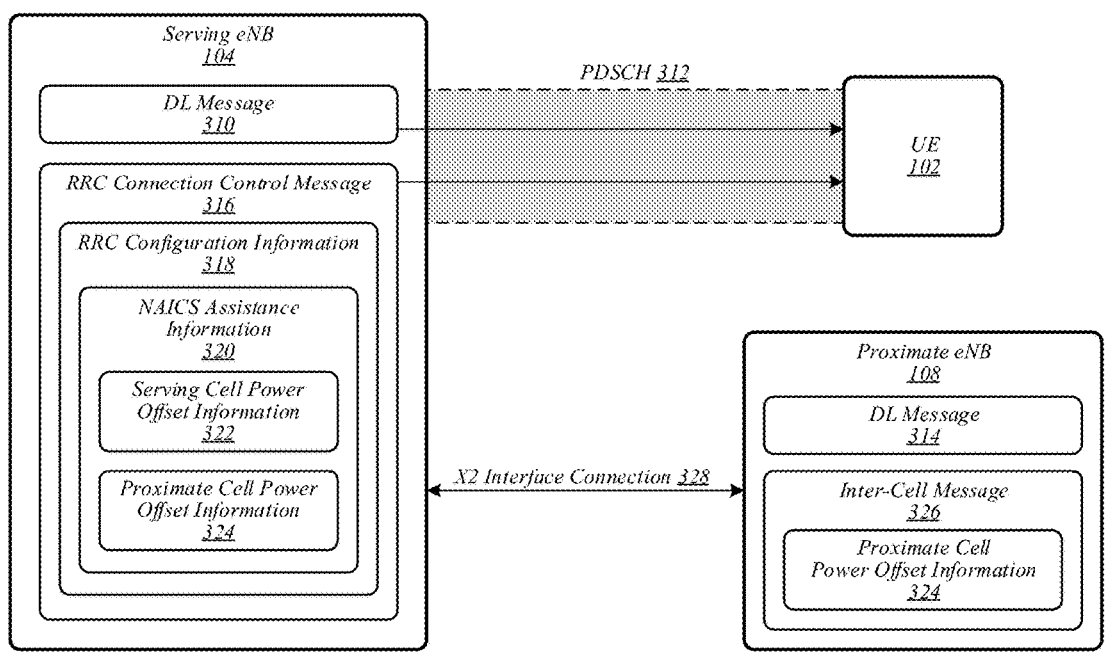
FIG. 3 illustrates an embodiment of a second operating environment.

FIG. 3 illustrates an example of an operating environment 300 in which communications may be exchanged among UE 102, serving eNB 104, and proximate eNB 108 of FIG. 1 in conjunction with the application of power offset signaling techniques for NAICS receivers in various embodiments. In operating environment 300, serving eNB 104 may be operative to transmit a DL message 310 over a PDSCH 312 of a cell served by serving eNB 104. Concurrently, proximate eNB 108 may be operative to transmit a DL message 314 over a PDSCH of a cell that it serves. In some embodiments, serving eNB 104 may serve a cell that constitutes a serving cell for UE 102, and proximate eNB 108 may serve a cell that neighbors—or is otherwise located in relatively close proximity to—the cell served by serving eNB 104. Hereinafter, the term "serving cell" is used to denote the cell served by serving eNB 104, and the term "proximate cell" is used to denote the cell served by proximate eNB 108.

In various embodiments, DL message 310 may comprise data intended for UE 102. In some embodiments, the transmission of DL message 314 by proximate eNB 108 may interfere with DL message 310, and may hinder the ability of UE 102 to successfully receive DL message 310 and extract the data comprised within. In various embodiments, in order to mitigate the degree to which DL message 314 interferes with DL message 310, UE 102 may employ NAICS techniques. According to some such techniques in various embodiments, UE 102 may utilize knowledge of various network-side parameters in order to implement NAICS inter-cell interference mitigation algorithms. In some embodiments, such network-side parameters may include parameters that describe configurations and/or operations of serving eNB 104 and/or proximate eNB 108. The embodiments are not limited in this context.

In various embodiments, serving eNB 104 may be operative to send NAICS assistance information 320 to UE 102 in order to provide support for NAICS inter-cell interference mitigation at UE 102. In some embodiments, NAICS assistance information 320 may comprise one or more network-side parameters describing configurations and/or operations of serving eNB 104 and/or proximate eNB 108. In various embodiments, serving eNB 104 may be operative to send NAICS assistance information 320 by including it in an RRC connection control message 316 that it sends to UE 102. In some embodiments, RRC connection control message 316 may comprise a message that serving eNB 104 sends in order to establish, reestablish, or reconfigure an RRC connection between serving eNB 104 and UE 102. In various embodiments, RRC connection control message 316 may comprise an RRCConnectionSetup, RRCConnectionReestablishment, or RRCConnectionReconfiguration message according to 3GPP TS 36.331 v 12.1.0 (March 2014), and/or according to any predecessor, variant, or progeny thereof. The embodiments are not limited in this context.

In some embodiments, the information comprised in RRC connection control message 316 may include RRC configuration information 318 that specifies various parameters relating to configuration of the RRC connection between serving eNB 104 and UE 102. In various embodiments, RRC configuration information 318 may be comprised in a RadioResourceConfigDedicated field within RRC connection control message 316. In some embodiments, NAICS assistance information 320 may be comprised in RRC configuration information 318. In various embodiments, for example, NAICS assistance information 320 may be comprised in one or more sub-fields of a RadioResourceConfigDedicated field in an RRCConnectionSetup, RRCConnectionReestablishment, or RRCConnectionReconfiguration message. In some embodiments, the presence of RRC configuration information 318 in RRC connection control message 316 may cause UE 102 to perform a radio resource configuration procedure in response to receipt of RRC connection control message 316. For example, in various embodiments, UE 102 may perform a radio resource configuration procedure in response to receipt of an RRC connection control message 316 containing RRC configuration information 318 that comprises a RadioResourceConfigDedicated field. The embodiments are not limited in this context.

In some embodiments, in order to enhance the effectiveness of NAICS inter-cell interference mitigation at UE 102, serving eNB 104 may be operative to include power offset information among the NAICS assistance information 320 that it sends to UE 102. In various embodiments, for example, NAICS assistance information 320 may include serving cell power offset information 322. Serving cell power offset information 322 may generally comprise information characterizing the relative respective powers with which serving eNB 104 transmits, has transmitted, and/or may transmit various types of REs to UE 102. In some embodiments, serving cell power offset information 322 may comprise one or more PDSCH power offsets that are applicable to transmissions by serving eNB 104 over PDSCH 312. The embodiments are not limited in this context.

In various embodiments, NAICS assistance information 320 may additionally or alternatively comprise proximate cell power offset information 324. Proximate cell power offset information 324 may generally comprise information characterizing the relative respective powers with which proximate eNB 108 transmits, has transmitted, and/or may transmit various types of REs to UEs within the proximate cell. In some embodiments, proximate cell power offset information 324 may comprise one or more PDSCH power offsets that are applicable to transmissions by proximate eNB 108 over a PDSCH of the proximate cell. In various embodiments, serving eNB 104 may be operative to receive proximate cell power offset information 324 from proximate eNB 108 and may then include it in NAICS assistance information 320. In some embodiments, proximate eNB 108 may be operative to provide serving eNB 104 with proximate cell power offset information 324 by sending an inter-cell message 326 that comprises the proximate cell power offset information 324. In various embodiments, proximate eNB 108 may be operative to send inter-cell message 326 to serving eNB 104 over an X2 interface connection 328 between serving eNB 104 and proximate eNB 108. The embodiments are not limited in this context.

In some embodiments, serving eNB 104 may be operative to send NAICS assistance information 320—possibly encapsulated within RRC configuration information 318 and/or RRC connection control message 316—to UE 102 over PDSCH 312. In various embodiments, following receipt of NAICS assistance information 320, UE 102 may be operative to store NAICS assistance information 320 for use in subsequent NAICS operations. In some embodiments, serving eNB 104 may periodically send current NAICS assistance information 320 to UE 102. In various embodiments, UE 102 may periodically update or replace previously stored NAICS assistance information 320 with newly received NAICS assistance information 320. The embodiments are not limited in this context.

As mentioned previously, in some embodiments, proximate eNB 108 may be operative to transmit DL message 314 concurrently with the transmission of DL message 310 from serving eNB 104 to UE 102. In various embodiments, in order to mitigate inter-cell interference with DL message 310 by DL message 314, UE 102 may be operative to use NAICS assistance information 320 to implement one or more NAICS interference mitigation techniques and/or algorithms. In some embodiments, UE 102 may use some or all of serving cell power offset information 322 and/or proximate cell power offset information 324 to implement one or more of those NAICS interference mitigation techniques and/or algorithms. The embodiments are not limited in this context.

In various embodiments, the PDSCH power offset that serving eNB 104 applies when transmitting over PDSCH 312 may depend on the modulation scheme being used, such that the CRS/PDSCH transmission power ratio associated with one modulation scheme may differ from that associated with another modulation scheme. In some embodiments, UE 102 may already have knowledge of the PDSCH power offset that serving eNB 104 uses in conjunction with some modulation schemes, but may not have knowledge of the PDSCH power offset that serving eNB 104 uses in conjunction with other modulation schemes. In various embodiments, for example, UE 102 may have knowledge of a PDSCH power offset PA that serving eNB 104 uses in conjunction with quadrature amplitude modulation (QAM) schemes such as 16QAM, 64QAM, and/or 256 QAM, but may not have knowledge of the CRS/PDSCH transmission power ratio(s) that serving eNB 104 uses in conjunction with quadrature phase-shift keying (QPSK) modulation. The embodiments are not limited to this example.

In some embodiments, in order to inform UE 102 of one or more modulation-specific CRS/PDSCH transmission power ratios to which it would not otherwise be privy, serving eNB 104 may include one or more PDSCH power offset values in serving cell power offset information 322. For example, in various embodiments, serving eNB 104 may include a PDSCH power offset $P_{A2}$ within serving cell power offset information 322, and the PDSCH power offset $P_{A2}$ may comprise a dedicated power offset for QPSK modulation. In some embodiments, the PDSCH power offset $P_{A2}$ may apply to some applications of QPSK modulation but not to other applications of QPSK modulation. For example, in various embodiments, the PDSCH power offset $P_{A2}$ may apply only to QPSK-modulated cell radio network temporary identifier (C-RNTI)-based PDSCH transmissions. In another example, in some embodiments, the PDSCH power offset $P_{A2}$ may apply only to QPSK-modulated C-RNTI-based PDSCH transmissions and QPSK-modulated semi-persistent scheduling (SPS) C-RNTI-based PDSCH transmissions. In various embodiments, serving eNB 104 may be configured to select a value of $P_{A2}$ from among a defined set of permitted values. In some such embodiments, serving eNB 104 may be configured to select the value of $P_{A2}$ from among a same defined set of permitted values as that from among which it selects $P_A$. In an example embodiment, serving eNB 104 may be configured to select $P_A$ values and $P_{A2}$ values from among a same permitted value set of {−6 dB, −4.77 dB, −3 dB, −1.77 dB, 0 dB, 1 dB, 2 dB, 3 dB}. In various other embodiments, different sets of permitted values may be defined for $P_A$ and $P_{A2}$, and serving eNB 104 may be configured to select $P_A$ and $P_{A2}$ values from among their respective permitted value sets. The embodiments are not limited in this context.

It is worthy of note that in some embodiments, rather than implementing a dedicated power offset $P_{A2}$ for QPSK modulation, serving eNB 104 may be configured apply the QAM-associated power offset $P_A$ to some or all types of QPSK-modulated transmissions over PDSCH 312. For example, in various embodiments, serving eNB 104 may be configured to apply the power offset $P_A$ to QPSK-modulated C-RNTI-based PDSCH transmissions and/or QPSK-modulated SPS C-RNTI-based PDSCH transmissions but not to other QPSK-modulated PDSCH transmissions. The embodiments are not limited to this example.

In some embodiments, serving eNB 104 may be configured to operate in accordance with one or more subframe-specific PDSCH power offset parameters. For example, in various embodiments, a PDSCH power offset $P_{A(ABS)}$ may be defined that applies to almost-blank subframes (ABSs). In some embodiments, serving eNB 104 may be configured to select a $P_{A(ABS)}$ value for application to PDSCH transmissions during ABSs and to select a $P_A$ value for application to PDSCH transmissions during other subframes. In various embodiments, serving eNB 104 may be configured to include the selected $P_{A(ABS)}$ value in serving cell power offset information 322. In some embodiments, a set of permitted values for $P_{A(ABS)}$ may be defined that is distinct from a set of permitted values for $P_A$, and serving eNB 104 may be configured to select $P_A$ and $P_{A(ABS)}$ values from their respective permitted value sets. In various other embodiments, serving eNB 104 may be configured to select $P_{A(ABS)}$ values from among the same set of permitted values as that from among which it selects $P_A$ values.

In some embodiments, the use of subframe-specific PDSCH power offset parameter(s) may be combined with the use of modulation-specific PDSCH power offset parameter(s). For example, in various embodiments, serving eNB 104 may be configured to observe a PDSCH power offset $P_A$ that applies to 16QAM, 64QAM, and 256QAM-modulated PDSCH transmissions, to observe a PDSCH power offset $P_{A(ABS)}$ that applies to QPSK-modulated PDSCH transmissions during ABSs, and to observe a PDSCH power offset $P_{A2}$ that applies to QPSK-modulated PDSCH transmissions during subframes that are not ABSs Likewise, in some embodiments, the use of subframe-specific permitted value set(s) may be combined with the use of modulation-specific permitted value set(s). It is worthy of note that in various embodiments, there may not be a one-to-one correspondence between the number of distinct PDSCH power offset parameters and the number of distinct permitted value sets. For example, in the aforementioned scenario in which serving eNB 104 is configured to observe PDSCH power offset parameters $P_A$, $P_{A2}$, and $P_{A(ABS)}$, it may be configured to select $P_{A(ABS)}$ values from among the same set of permitted values as that from among which it selects $P_{A2}$ values. The embodiments are not limited to this example.

It is to be appreciated that the PDSCH power offset value(s) that serving eNB 104 applies when transmitting to UE 102 may not necessarily be the same as the PDSCH power offset value(s) that serving eNB 104 applies when transmitting to any other particular UE in the serving cell. For example, serving eNB 104 may report a first $P_A$ value and/or a first $P_{A2}$ value to UE 102, transmit data to UE 102 over PDSCH 312 according to the first $P_A$ value and/or the first $P_{A2}$ value, report a second $P_A$ value and/or a second $P_{A2}$ value to a second UE, and transmit data to UE 102 over PDSCH 312 according to the second $P_A$ value and/or the second $P_{A2}$ value. In other words, in some embodiments, the PDSCH power offset value(s) that serving eNB 104 select and applies may be UE-specific.

Likewise, in various embodiments, proximate eNB 108 may be configured to select and apply UE-specific PDSCH power offset values that may differ from UE to UE. As such, during any given time interval, proximate eNB 108 may perform PDSCH transmission according to multiple power offset values. Since proximate eNB 108 has no way of knowing which of its PDSCH transmissions will or will not result in interference with a given message at a given UE in the serving cell at a given time, proximate eNB 108 may not be able to specify the "correct" power offset value(s) that UE 102 should assume with respect to any particular interfering transmission. However, with respect to a given time interval, proximate eNB 108 may still be able to provide assistance for NAICS interference mitigation at UE 102—and/or for NAICS interference mitigation at other UEs in the serving cell and/or other nearby cells—by forwarding proximate cell power offset information 324 that identifies the set(s) of particular PDSCH power offset values that proximate eNB 108 employs, employed, or will employ during that time interval.

In some embodiments, proximate eNB 108 may be configured to send proximate cell power offset information 324 that identifies—from among a defined set of allowed PDSCH power offset values—a subset of one or more PDSCH power offset values that proximate eNB 108 has used, uses, or expects to use during any given time interval. For example, in various embodiments, the allowed values of power offset $P_A$ may comprise the set {−6 dB, −4.77 dB, −3 dB, −1.77 dB, 0 dB, 1 dB, 2 dB, 3 dB}. In such an embodiment, if proximate eNB 108 only expects to use $P_A$ values of −3 dB, 0 dB, and 3 dB, it may send proximate cell power offset information 324 that identifies the subset {−3 dB, 0 dB, 3 dB}. The embodiments are not limited to this example.

In some embodiments, proximate eNB 108 may be configured to send proximate cell power offset information 324 that identifies multiple subsets of PDSCH power offset values, where each subset corresponds to one or more respective modulation schemes. For example, in various embodiments in which distinct PDSCH power offset parameters $P_A$ and $P_{A2}$ are implemented, proximate cell power offset information 324 may include a first subset containing the value(s) that proximate eNB 108 expects to use for $P_A$ and a second subset containing the value(s) it expects to use for $P_{A2}$. In some embodiments, for a PDSCH power offset parameter that applies to multiple modulation schemes, proximate cell power offset information 324 may include multiple subsets, each of which may correspond to a particular respective scheme or subset of schemes. For example, in various embodiments in which PDSCH power offset parameter $P_A$ is applicable to both 16QAM-modulated and 64QAM-modulated transmissions, proximate cell power offset information 324 may comprise a first subset containing the $P_A$ value(s) that proximate eNB 108 expects to use for 16QAM-modulated PDSCH transmissions and a second subset containing the $P_A$ value(s) that proximate eNB 108 expects to use for 64QAM-modulated PDSCH transmissions. In some embodiments in which proximate cell power offset information 324 includes multiple subsets associated with a same PDSCH power offset parameter, it may also include one or more additional subsets associated with one or more additional PDSCH power offset parameters. For example, in various embodiments, proximate cell power offset information 324 may comprise a first subset containing the $P_A$ value(s) that proximate eNB 108 expects to use for 16QAM-modulated PDSCH transmissions, a second subset containing the $P_A$ value(s) that proximate eNB 108 expects to use for 64QAM-modulated PDSCH transmissions, and a third subset containing the $P_{A2}$ value(s) that proximate eNB 108 expects to use for QPSK-modulated PDSCH transmissions. The embodiments are not limited to these examples.

In some embodiments in which distinct power offset parameters $P_A$ and $P_{A2}$ are implemented, the same defined set of permitted values may apply to both. As such, in various embodiments in which proximate cell power offset information 324 contains first and second subsets respectively comprising $P_A$ values and $P_{A2}$ values, those first and second subsets may comprise subsets of a same set of permitted values. In some other embodiments in which distinct power offset parameters $P_A$ and $P_{A2}$ are implemented, different respective sets of permitted values may be defined for $P_A$ and $P_{A2}$. Thus, in various other embodiments in which proximate cell power offset information 324 contains first and second subsets respectively comprising $P_A$ values and $P_{A2}$ values, those first and second subsets may comprise subsets of different respective sets of permitted values. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
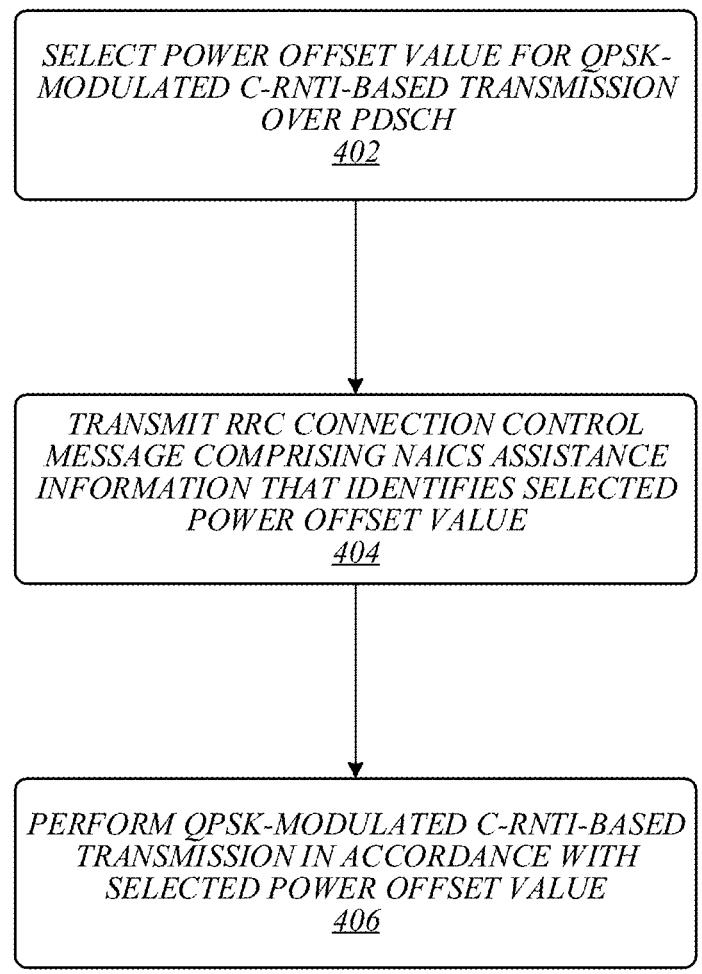
FIG. 4 illustrates an embodiment of a first logic flow.

FIG. 4 illustrates one embodiment of a logic flow 400, which may be representative of operations executed by serving eNB 104 of FIGS. 1 and/or 3 in some embodiments. As shown in FIG. 4, a power offset value for a QPSK-modulated C-RNTI-based transmission over a PDSCH may be selected at 402. For example, serving eNB 104 of FIG. 3 may be operative to select a power offset value for a QPSK-modulated C-RNTI-based transmission to UE 102 over PDSCH 312. In various embodiments, the power offset value for the QPSK-modulated C-RNTI-based transmission may comprise a value for a power offset parameter that determines a ratio between a PDSCH energy per resource element (EPRE) and a CRS EPRE for the QPSK-modulated C-RNTI-based transmission. In some embodiments, the power offset value for the QPSK-modulated C-RNTI-based transmission may be selected from among a defined set of values. In various embodiments, the defined set of values may comprise the set {−6 dB, −4.77 dB, −3 dB, −1.77 dB, 0 dB, 1 dB, 2 dB, 3 dB}. The embodiments are not limited in this context.

In some embodiments, a power offset value for a QAM-modulated transmission over the PDSCH may also be selected. For example, serving eNB 104 of FIG. 3 may also be operative to select a power offset value for a QAM-modulated transmission to UE 102 over PDSCH 312. In various embodiments, the power offset value for the QAM-modulated transmission may comprise a value for a power offset parameter that determines a ratio between a PDSCH EPRE and a CRS EPRE for the QAM-modulated transmission. In some embodiments, the power offset value for the QAM-modulated transmission and the power offset value for the QPSK-modulated C-RNTI-based transmission may be selected from among a common set of values. The embodiments are not limited in this context.

At 404, an RRC connection control message may be transmitted that comprises NAICS assistance information identifying the selected power offset value for the QPSK-modulated C-RNTI-based transmission to the UE. For example, serving eNB 104 of FIG. 3 may be operative to transmit an RRC connection control message 316 comprising NAICS assistance information 320 that identifies the power offset value that it has selected for the QPSK-modulated C-RNTI-based transmission to UE 102. In various embodiments, the RRC connection control message may comprise an RRCConnectionSetup message, an RRCConnectionReestablishment message, or an RRCConnectionReconfiguration message. In some embodiments, the NAICS assistance information may be comprised within a RadioResourceConfigDedicated field of the RRC connection control message. In various such embodiments, the NAICS assistance information may be comprised within a subfield of the RadioResourceConfigDedicated field. The embodiments are not limited in this context.

In some embodiments in which a power offset value is also selected for a QAM-modulated transmission to the UE, the RRC connection control message may also comprise information identifying the selected power offset value for the QAM-modulated transmission to the UE. For example, RRC connection control message 316 of FIG. 3 may comprise information identifying a power offset value that serving eNB 104 has selected for a QAM-modulated transmission to UE 102 over PDSCH 312, as well as NAICS assistance information 320 identifying the power offset value that serving eNB 104 has selected for the QPSK-modulated C-RNTI-based transmission to UE 102 over PDSCH 312. In various embodiments, the information identifying the selected power offset value for the QAM-modulated transmission may be comprised within an RadioResourceConfigDedicated field of the RRC connection control message. The embodiments are not limited in this context.

At 406, the QPSK-modulated C-RNTI-based transmission may be performed in accordance with the power offset value that has been selected for the QPSK-modulated C-RNTI-based transmission. For example, serving eNB 104 of FIG. 3 may be operative to perform a QPSK-modulated C-RNTI-based transmission to UE 102 over PDSCH 312 in accordance with a power offset value that it has selected and reported to UE 102 via RRC connection control message 316. In some embodiments in which a power offset value is also selected for a QAM-modulated transmission to the UE, the QAM-modulated transmission may be performed in accordance with that selected power offset value. For example, serving eNB 104 of FIG. 3 may be operative to perform a QAM-modulated transmission to UE 102 over PDSCH 312 in accordance with a power offset value that it has selected and reported to UE 102 via RRC connection control message 316. The embodiments are not limited in this context.

FIG. 5 illustrates one embodiment of a logic flow 500, which may be representative of operations executed by UE 102 of FIG. 3 in various embodiments. As shown in FIG. 5, an RRC connection control message may be received at 502 that comprises NAICS assistance information identifying a power offset value for QPSK-modulated C-RNTI-based transmissions to a UE over a PDSCH of a serving cell of the UE. For example, UE 102 of FIG. 3 may be operative to receive an RRC connection control message 316 comprising NAICS assistance information 320 that identifies a power offset value for QPSK-modulated C-RNTI-based transmissions from serving eNB 104 to UE 102 over PDSCH 312. In some embodiments, the RRC connection control message may comprise an RRCConnectionSetup message, an RRCConnectionReestablishment message, or an RRCConnectionReconfiguration message. In various embodiments, the RRC connection control message may comprise a RadioResourceConfigDedicated field. In some embodiments, the NAICS assistance information may be comprised within the RadioResourceConfigDedicated field. In various embodiments, the NAICS assistance information may be comprised within a subfield of the RadioResourceConfigDedicated field. In some embodiments, the power offset value may be comprised among a defined set of values. In various embodiments, the defined set of values may comprise the set {−6 dB, −4.77 dB, −3 dB, −1.77 dB, 0 dB, 1 dB, 2 dB, 3 dB}. In some embodiments, the RRC connection control message may also comprise information identifying a power offset value for one or more quadrature amplitude modulation (QAM)-modulated transmissions to the UE over the PDSCH of the serving cell. The embodiments are not limited in this context.

At 504, a radio resource configuration procedure may be performed in response to receipt of the RRC connection control message. In various embodiments, the radio resource configuration procedure may be performed based on the presence of a RadioResourceConfigDedicated field within the RRC connection control message. For example, UE 102 of FIG. 3 may be operative to perform a radio resource configuration procedure in response to receipt of a RRC connection control message 316 comprising a RadioResourceConfigDedicated field. At 506, one or more NAICS inter-cell interference mitigation algorithms may be applied to one or more transmissions received over the PDSCH of the serving cell based on the power offset value for QPSK-modulated C-RNTI-based transmissions to the UE. For example, UE 102 of FIG. 3 may be operative to apply one or more NAICS inter-cell interference mitigation algorithms to DL message 310 based on a received power offset value for QPSK-modulated C-RNTI-based transmissions to UE 102 over PDSCH 312. The embodiments are not limited in this context.

FIG. 6 illustrates one embodiment of a logic flow 600, which may be representative of operations executed by proximate eNB 108 of FIG. 3 in some embodiments. As shown in FIG. 6, one or more power offset values to be applied to DL transmissions over a PDSCH may be identified at 602. For example, proximate eNB 108 of FIG. 3 may be operative to identify one or more power offset values to apply to DL transmissions over a PDSCH of a cell served by proximate eNB 108. At 604, a message may be sent over an X2 interface to report the one or more power offset values. For example, proximate eNB 108 of FIG. 3 may be operative to send an inter-cell message 326 comprising proximate cell power offset information 324 to serving eNB 104 over X2 interface connection 328 in order to report the one or more power offset values that it has selected for DL transmissions over the PDSCH of the cell served by proximate eNB 108. At 606, one or more DL transmissions may be performed over the PDSCH according to the one or more power offset values. For example, proximate eNB 108 of FIG. 3 may be operative to perform one or more DL PDSCH transmissions according to one or more power offset values that it has selected and reported to serving eNB 104. The embodiments are not limited in this context.

FIG. 7A illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement logic flow 400 of FIG. 4 and/or logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

FIG. 7B illustrates an embodiment of a storage medium 750. Storage medium 750 may comprise any non-transitory computer-readable storage medium or machine-readable storage medium, such as an optical, magnetic or semiconductor storage medium. In various embodiments, storage medium 750 may comprise an article of manufacture. In some embodiments, storage medium 750 may store computer-executable instructions, such as computer-executable instructions to implement logic flow 500 of FIG. 5. Examples of a computer-readable storage medium, a machine-readable storage medium, and computer-executable instructions may include—without limitation—any of the respective examples previously mentioned with respect to storage medium 700 of FIG. 7A. The embodiments are not limited in this context.

Figure 8:
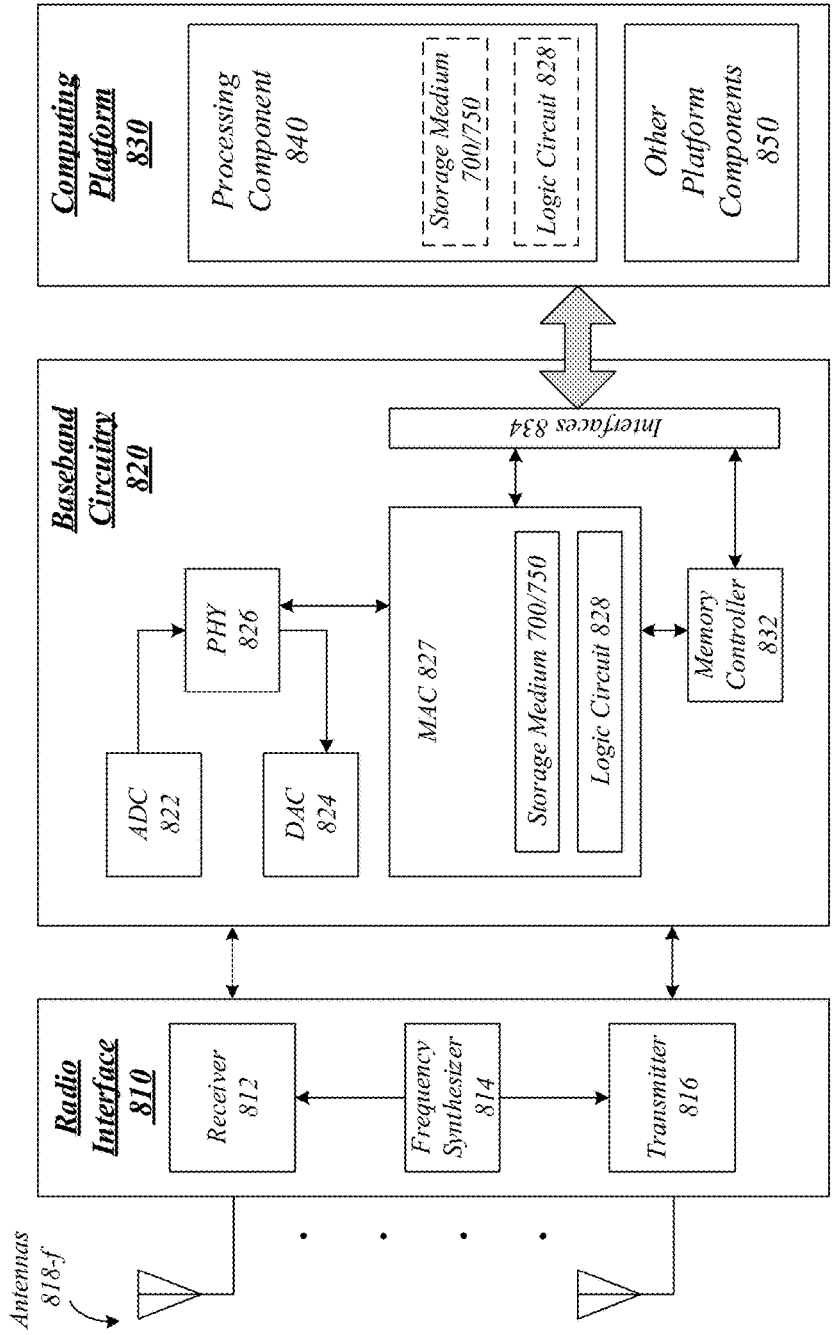
FIG. 8 illustrates an embodiment a device.

FIG. 8 illustrates an embodiment of a device 800 that may implement one or more of UE 102, serving eNB 104, and proximate eNB 108 of FIGS. 1 and 3, logic flow 400 of FIG. 4, logic flow 500 of FIG. 5, logic flow 600 of FIG. 6, storage medium 700 of FIG. 7A, and storage medium 750 of FIG. 7B. In various embodiments, device 800 may comprise a logic circuit 828. The logic circuit 828 may include physical circuits to perform operations described for one or more of UE 102, serving eNB 104, and proximate eNB 108 of FIGS. 1 and 3, logic flow 400 of FIG. 4, logic flow 500 of FIG. 5, and logic flow 600 of FIG. 6, for example. As shown in FIG. 8, device 800 may include a radio interface 810, baseband circuitry 820, and computing platform 830, although the embodiments are not limited to this configuration.

The device 800 may implement some or all of the structure and/or operations for one or more of UE 102, serving eNB 104, and proximate eNB 108 of FIGS. 1 and 3, logic flow 400 of FIG. 4, logic flow 500 of FIG. 5, logic flow 600 of FIG. 6, storage medium 700 of FIG. 7A, storage medium 750 of FIG. 7B, and logic circuit 828 in a single computing entity, such as entirely within a single device. Alternatively, the device 800 may distribute portions of the structure and/or operations for one or more of UE 102, serving eNB 104, and proximate eNB 108 of FIGS. 1 and 3, logic flow 400 of FIG. 4, logic flow 500 of FIG. 5, logic flow 600 of FIG. 6, storage medium 700 of FIG. 7A, storage medium 750 of FIG. 7B, and logic circuit 828 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols although the embodiments are not limited to any specific over-the-air interface or modulation scheme. Radio interface 810 may include, for example, a receiver 812, a frequency synthesizer 814, and/or a transmitter 816. Radio interface 810 may include bias controls, a crystal oscillator and/or one or more antennas 818-f. In another embodiment, radio interface 810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals, a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a medium access control (MAC) processing circuit 827 for MAC/data link layer processing. Baseband circuitry 820 may include a memory controller 832 for communicating with MAC processing circuit 827 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames. Alternatively or in addition, MAC processing circuit 827 may share processing for certain of these functions or perform these processes independent of PHY processing circuit 826. In some embodiments, MAC and PHY processing may be integrated into a single circuit.

The computing platform 830 may provide computing functionality for the device 800. As shown, the computing platform 830 may include a processing component 840. In addition to, or alternatively of, the baseband circuitry 820, the device 800 may execute processing operations or logic for one or more of UE 102, serving eNB 104, and proximate eNB 108 of FIGS. 1 and 3, logic flow 400 of FIG. 4, logic flow 500 of FIG. 5, logic flow 600 of FIG. 6, storage medium 700 of FIG. 7A, storage medium 750 of FIG. 7B, and logic circuit 828 using the processing component 840. The processing component 840 (and/or PHY 826 and/or MAC 827) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired.

Embodiments of device 800 may be implemented using single input single output (SISO) architectures. However, certain implementations may include multiple antennas (e.g., antennas 818-*f*) for transmission and/or reception using adaptive antenna techniques for beamforming or spatial division multiple access (SDMA) and/or using MIMO communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 9:
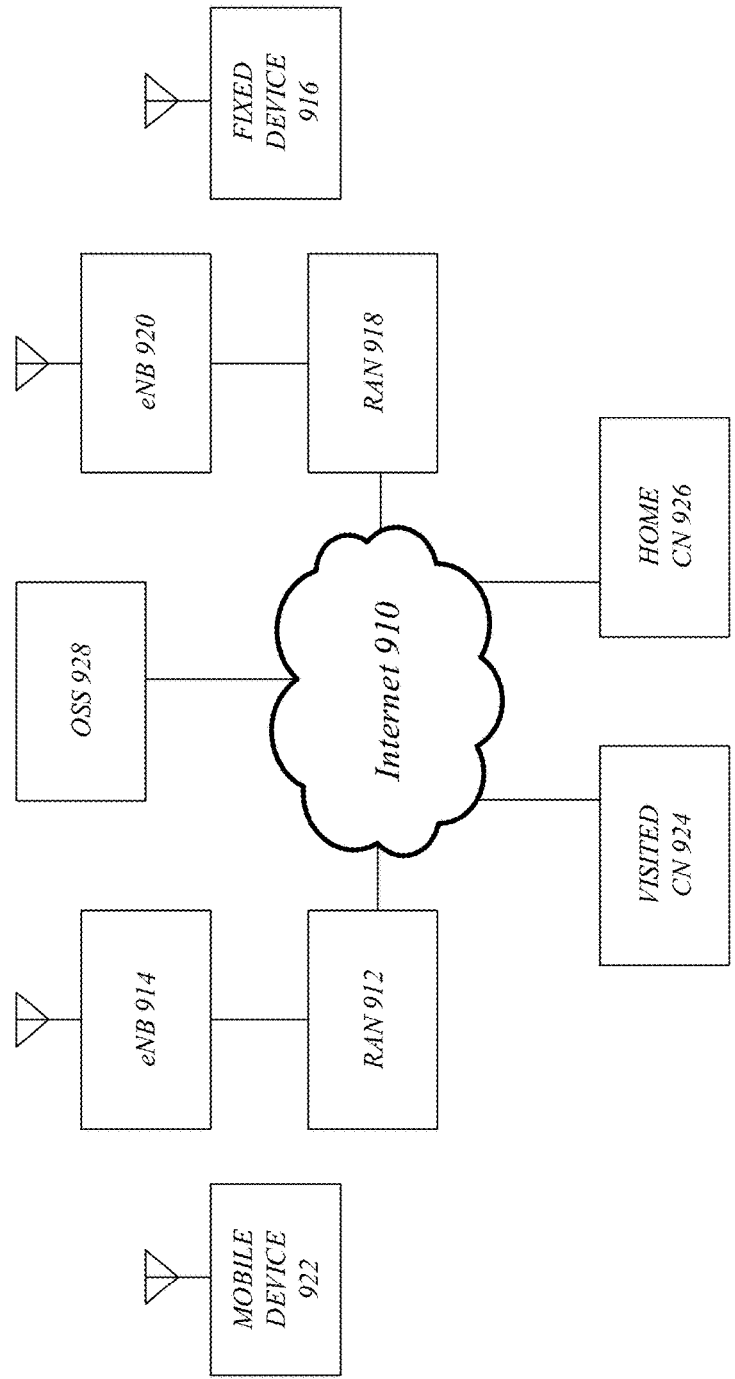
FIG. 9 illustrates an embodiment of a wireless network.

FIG. 9 illustrates an embodiment of a broadband wireless access system 900. As shown in FIG. 9, broadband wireless access system 900 may be an internet protocol (IP) type network comprising an internet 910 type network or the like that is capable of supporting mobile wireless access and/or fixed wireless access to internet 910. In one or more embodiments, broadband wireless access system 900 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 900, radio access networks (RANs) 912 and 918 are capable of coupling with evolved node Bs (eNBs) 914 and 920, respectively, to provide wireless communication between one or more fixed devices 916 and internet 910 and/or between or one or more mobile devices 922 and Internet 910. One example of a fixed device 916 and a mobile device 922 is device 800 of FIG. 8, with the fixed device 916 comprising a stationary version of device 800 and the mobile device 922 comprising a mobile version of device 800. RANs 912 and 918 may implement profiles that are capable of defining the mapping of network functions to one or more physical entities on broadband wireless access system 900. eNBs 914 and 920 may comprise radio equipment to provide RF communication with fixed device 916 and/or mobile device 922, such as described with reference to device 800, and may comprise, for example, the PHY and MAC layer equipment in compliance with a 3GPP LTE Specification or an IEEE 802.16 Standard. eNBs 914 and 920 may further comprise an IP backplane to couple to Internet 910 via RANs 912 and 918, respectively, although the scope of the claimed subject matter is not limited in these respects.

Broadband wireless access system 900 may further comprise a visited core network (CN) 924 and/or a home CN 926, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 924 and/or home CN 926, and the scope of the claimed subject matter is not limited in these respects. Visited CN 924 may be referred to as a visited CN in the case where visited CN 924 is not part of the regular service provider of fixed device 916 or mobile device 922, for example where fixed device 916 or mobile device 922 is roaming away from its respective home CN 926, or where broadband wireless access system 900 is part of the regular service provider of fixed device 916 or mobile device 922 but where broadband wireless access system 900 may be in another location or state that is not the main or home location of fixed device 916 or mobile device 922. The embodiments are not limited in this context.

Fixed device 916 may be located anywhere within range of one or both of eNBs 914 and 920, such as in or near a home or business to provide home or business customer broadband access to Internet 910 via eNBs 914 and 920 and RANs 912 and 918, respectively, and home CN 926. It is worthy of note that although fixed device 916 is generally disposed in a stationary location, it may be moved to different locations as needed. Mobile device 922 may be utilized at one or more locations if mobile device 922 is within range of one or both of eNBs 914 and 920, for example. In accordance with one or more embodiments, operation support system (OSS) 928 may be part of broadband wireless access system 900 to provide management functions for broadband wireless access system 900 and to provide interfaces between functional entities of broadband wireless access system 900. Broadband wireless access system 900 of FIG. 9 is merely one type of wireless network showing a certain number of the components of broadband wireless access system 900, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an evolved node B (eNB), comprising: logic, at least a portion of which is in hardware, the logic to select a power offset value for a quadrature phase-shift keying (QPSK)-modulated cell radio network temporary identifier (C-RNTI)-based transmission over a physical downlink shared channel (PDSCH) of a cell served by the eNB and send a radio resource control (RRC) connection control message comprising network-assisted interference cancellation and suppression (NAICS) assistance information that identifies the selected power offset value.

Example 2 is the eNB of Example 1, the NAICS assistance information to be comprised within a RadioResourceConfigDedicated field of the RRC connection control message.

Example 3 is the eNB of Example 1, the power offset value to comprise a value for a power offset parameter that determines a ratio between a PDSCH energy per resource element (EPRE) and a cell-specific reference signal (CRS) EPRE.

Example 4 is the eNB of Example 1, the logic to select the power offset value for the QPSK-modulated C-RNTI-based transmission over the PDSCH and a power offset value for a quadrature amplitude modulation (QAM)-modulated transmission over the PDSCH from among a common set of values.

Example 5 is the eNB of Example 1, the logic to select the power offset value for the QPSK-modulated C-RNTI-based transmission over the PDSCH from among a defined set of values comprising −6 dB, −4.77 dB, −3 dB, −1.77 dB, 0 dB, 1 dB, 2 dB, and 3 dB.

Example 6 is the eNB of Example 1, the RRC connection control message to comprise an RRCConnectionSetup message, an RRCConnectionReestablishment message, or an RRCConnectionReconfiguration message.

Example 7 is the eNB of any of Examples 1 to 6, comprising: one or more radio frequency (RF) transceivers; and one or more RF antennas.

Example 8 is the eNB of Example 7, comprising at least one memory unit.

Example 9 is at least one non-transitory computer-readable storage medium comprising a set of instructions that, in response to being executed by user equipment (UE), cause the UE to: receive a radio resource control (RRC) connection control message comprising a RadioResourceConfigDedicated field, the RRC connection control message to comprise network-assisted interference cancellation and suppression (NAICS) assistance information that identifies a power offset value for one or more transmissions to the UE over a physical downlink shared channel (PDSCH) of a serving cell of the UE; and perform a radio resource configuration procedure in response to receipt of the RRC connection control message.

Example 10 is the at least one non-transitory computer-readable storage medium of Example 9, the one or more transmissions to comprise quadrature phase-shift keying (QPSK)-modulated cell radio network temporary identifier (C-RNTI)-based transmissions.

Example 11 is the at least one non-transitory computer-readable storage medium of Example 10, the RRC connection control message to comprise information identifying a power offset value for one or more quadrature amplitude modulation (QAM)-modulated transmissions to the UE over the PDSCH of the serving cell.

Example 12 is the at least one non-transitory computer-readable storage medium of Example 9, the NAICS assistance information to be comprised within a subfield of the RadioResourceConfigDedicated field.

Example 13 is the at least one non-transitory computer-readable storage medium of Example 9, the power offset value to be comprised among a defined set of values comprising −6 dB, −4.77 dB, −3 dB, −1.77 dB, 0 dB, 1 dB, 2 dB, and 3 dB.

Example 14 is the at least one non-transitory computer-readable storage medium of Example 9, the RRC connection control message to comprise an RRCConnectionSetup message, an RRCConnectionReestablishment message, or an RRCConnectionReconfiguration message.

Example 15 is a wireless communication method, comprising: selecting, by processing circuitry at an evolved node B (eNB), a first power offset value comprising a power offset value for a quadrature phase-shift keying (QPSK)-modulated cell radio network temporary identifier (C-RNTI)-based transmission over a physical downlink shared channel (PDSCH) of a cell served by the eNB; selecting a second power offset value comprising a power offset value for a quadrature amplitude modulation (QAM)-modulated transmission over the PDSCH of the cell served by the eNB; and transmitting a radio resource control (RRC) connection control message containing a RadioResourceConfigDedicated field that comprises the first power offset value and the second power offset value.

Example 16 is the wireless communication method of Example 15, the RadioResourceConfigDedicated field to comprise network-assisted interference cancellation and suppression (NAICS) assistance information that identifies the first power offset value.

Example 17 is the wireless communication method of Example 16, the NAICS assistance information to be comprised in a subfield of the RadioResourceConfigDedicated field.

Example 18 is the wireless communication method of Example 15, comprising selecting the first power offset value and the second power offset value from among a common set of values.

Example 19 is the wireless communication method of Example 15, comprising selecting the first power offset value from among a defined set of values comprising −6 dB, −4.77 dB, −3 dB, −1.77 dB, 0 dB, 1 dB, 2 dB, and 3 dB.

Example 20 is the wireless communication method of Example 15, the RRC connection control message to comprise an RRCConnectionSetup message, an RRCConnectionReestablishment message, or an RRCConnectionReconfiguration message.

Example 21 is at least one non-transitory computer-readable storage medium comprising a set of instructions that, in response to being executed on a computing device, cause the computing device to perform a wireless communication method according to any of Examples 15 to 20.

Example 22 is an apparatus, comprising means for performing a wireless communication method according to any of Examples 15 to 20.

Example 23 is a system, comprising: an apparatus according to Example 22; one or more radio frequency (RF) transceivers; and one or more RF antennas.

Example 24 is the system of Example 23, comprising at least one memory unit.

Example 25 is user equipment (UE), comprising: means for receiving a radio resource control (RRC) connection control message; and means for performing a radio resource configuration procedure based on a RadioResourceConfigDedicated field comprised in the RRC connection control message, the RadioResourceConfigDedicated field to comprise network-assisted interference cancellation and suppression (NAICS) assistance information specifying a power offset value for quadrature phase-shift keying (QPSK)-modulated cell radio network temporary identifier (C-RNTI)-based transmissions to the UE over a physical downlink shared channel (PDSCH) of a serving cell of the UE.

Example 26 is the UE of Example 25, the NAICS assistance information to be comprised within a subfield of the RadioResourceConfigDedicated field.

Example 27 is the UE of Example 25, the RadioResourceConfigDedicated field to comprise information identifying a power offset value for quadrature amplitude modulation (QAM)-modulated transmissions to the UE over the PDSCH of the serving cell.

Example 28 is the UE of Example 25, the power offset value to be comprised among a defined set of values comprising −6 dB, −4.77 dB, −3 dB, −1.77 dB, 0 dB, 1 dB, 2 dB, and 3 dB.

Example 29 is the UE of Example 25, the RRC connection control message to comprise an RRCConnectionSetup message, an RRCConnectionReestablishment message, or an RRCConnectionReconfiguration message.

Example 30 is the UE of Example 25, comprising means for applying one or more NACIS inter-cell interference mitigation algorithms based on the power offset value for QPSK-modulated C-RNTI-based transmissions to the UE over the PDSCH of the serving cell of the UE.

Example 31 is the UE of any of Examples 25 to 30, comprising: one or more radio frequency (RF) transceivers; and one or more RF antennas.

Example 32 is the UE of Example 31, comprising a touchscreen display.

Example 33 is a wireless communication method, comprising: receiving, at user equipment (UE) a radio resource control (RRC) connection control message comprising a RadioResourceConfigDedicated field, the RRC connection control message to comprise network-assisted interference cancellation and suppression (NAICS) assistance information that identifies a power offset value for one or more transmissions to the UE over a physical downlink shared channel (PDSCH) of a serving cell of the UE; and performing, by processing circuitry of the UE, a radio resource configuration procedure in response to receipt of the RRC connection control message.

Example 34 is the wireless communication method of Example 33, the one or more transmissions to comprise quadrature phase-shift keying (QPSK)-modulated cell radio network temporary identifier (C-RNTI)-based transmissions.

Example 35 is the wireless communication method of Example 34, the RRC connection control message to comprise information identifying a power offset value for one or more quadrature amplitude modulation (QAM)-modulated transmissions to the UE over the PDSCH of the serving cell.

Example 36 is the wireless communication method of Example 33, the NAICS assistance information to be comprised within a subfield of the RadioResourceConfigDedicated field.

Example 37 is the wireless communication method of Example 33, the power offset value to be comprised among a defined set of values comprising −6 dB, −4.77 dB, −3 dB, −1.77 dB, 0 dB, 1 dB, 2 dB, and 3 dB.

Example 38 is the wireless communication method of Example 33, the RRC connection control message to comprise an RRCConnectionSetup message, an RRCConnectionReestablishment message, or an RRCConnectionReconfiguration message.

Example 39 is at least one non-transitory computer-readable storage medium comprising a set of instructions that, in response to being executed on a computing device, cause the computing device to perform a wireless communication method according to any of Examples 33 to 38.

Example 40 is an apparatus, comprising means for performing a wireless communication method according to any of Examples 33 to 38.

Example 41 is a system, comprising: an apparatus according to Example 40; one or more radio frequency (RF) transceivers; and one or more RF antennas.

Example 42 is the system of Example 41, comprising a touchscreen display.

Example 43 is an evolved node B (eNB), comprising: means for selecting a first power offset value comprising a power offset value for a quadrature phase-shift keying (QPSK)-modulated cell radio network temporary identifier (C-RNTI)-based transmission over a physical downlink shared channel (PDSCH) of a cell served by the eNB; means for selecting a second power offset value comprising a power offset value for a quadrature amplitude modulation (QAM)-modulated transmission over the PDSCH of the cell served by the eNB; and means for transmitting a radio resource control (RRC) connection control message containing a RadioResourceConfigDedicated field that comprises the first power offset value and the second power offset value.

Example 44 is the eNB of Example 43, the RadioResourceConfigDedicated field to comprise network-assisted interference cancellation and suppression (NAICS) assistance information that identifies the first power offset value.

Example 45 is the eNB of Example 44, the NAICS assistance information to be comprised in a subfield of the RadioResourceConfigDedicated field.

Example 46 is the eNB of Example 43, comprising means for selecting the first power offset value and the second power offset value from among a common set of values.

Example 47 is the eNB of Example 43, comprising means for selecting the first power offset value from among a defined set of values comprising −6 dB, −4.77 dB, −3 dB, −1.77 dB, 0 dB, 1 dB, 2 dB, and 3 dB.

Example 48 is the eNB of Example 43, the RRC connection control message to comprise an RRCConnectionSetup message, an RRCConnectionReestablishment message, or an RRCConnectionReconfiguration message.

Example 49 is the eNB of any of Examples 43 to 48, comprising: one or more radio frequency (RF) transceivers; and one or more RF antennas.

Example 50 is the eNB of Example 49, comprising at least one memory unit.

Example 51 is user equipment (UE), comprising: logic, at least a portion of which is in hardware, the logic to receive a radio resource control (RRC) connection control message and perform a radio resource configuration procedure based on a RadioResourceConfigDedicated field comprised in the RRC connection control message, the RadioResourceConfigDedicated field to comprise network-assisted interference cancellation and suppression (NAICS) assistance information specifying a power offset value for quadrature phase-shift keying (QPSK)-modulated cell radio network temporary identifier (C-RNTI)-based transmissions to the UE over a physical downlink shared channel (PDSCH) of a serving cell of the UE.

Example 52 is the UE of Example 51, the NAICS assistance information to be comprised within a subfield of the RadioResourceConfigDedicated field.

Example 53 is the UE of Example 51, the RadioResourceConfigDedicated field to comprise information identifying a power offset value for quadrature amplitude modulation (QAM)-modulated transmissions to the UE over the PDSCH of the serving cell.

Example 54 is the UE of Example 51, the power offset value to be comprised among a defined set of values comprising −6 dB, −4.77 dB, −3 dB, −1.77 dB, 0 dB, 1 dB, 2 dB, and 3 dB.

Example 55 is the UE of Example 51, the RRC connection control message to comprise an RRCConnectionSetup message, an RRCConnectionReestablishment message, or an RRCConnectionReconfiguration message.

Example 56 is the UE of Example 51, the logic to apply one or more NACIS inter-cell interference mitigation algorithms based on the power offset value for QPSK-modulated C-RNTI-based transmissions to the UE over the PDSCH of the serving cell of the UE.

Example 57 is the UE of any of Examples 51 to 56, comprising: one or more radio frequency (RF) transceivers; and one or more RF antennas.

Example 58 is the UE of Example 57, comprising a touchscreen display.

Example 59 is at least one non-transitory computer-readable storage medium comprising a set of instructions that, in response to being executed by an evolved node B (eNB), cause the eNB to: select a power offset value for a quadrature phase-shift keying (QPSK)-modulated cell radio network temporary identifier (C-RNTI)-based transmission over a physical downlink shared channel (PDSCH) of a cell served by the eNB; and send a radio resource control (RRC) connection control message comprising network-assisted interference cancellation and suppression (NAICS) assistance information that identifies the selected power offset value.

Example 60 is the at least one non-transitory computer-readable storage medium of Example 59, the NAICS assistance information to be comprised within a RadioResourceConfigDedicated field of the RRC connection control message.

Example 61 is the at least one non-transitory computer-readable storage medium of Example 59, the power offset value to comprise a value for a power offset parameter that determines a ratio between a PDSCH energy per resource element (EPRE) and a cell-specific reference signal (CRS) EPRE.

Example 62 is the at least one non-transitory computer-readable storage medium of Example 59, comprising instructions that, in response to being executed by the eNB, cause the eNB to select the power offset value for the QPSK-modulated C-RNTI-based transmission over the PDSCH and a power offset value for a quadrature amplitude modulation (QAM)-modulated transmission over the PDSCH from among a common set of values.

Example 63 is the at least one non-transitory computer-readable storage medium of Example 59, comprising instructions that, in response to being executed by the eNB, cause the eNB to select the power offset value for the QPSK-modulated C-RNTI-based transmission over the PDSCH from among a defined set of values comprising −6 dB, −4.77 dB, −3 dB, −1.77 dB, 0 dB, 1 dB, 2 dB, and 3 dB.

Example 64 is the at least one non-transitory computer-readable storage medium of Example 59, the RRC connection control message to comprise an RRCConnectionSetup message, an RRCConnectionReestablishment message, or an RRCConnectionReconfiguration message.

Example 65 is an evolved node B (eNB), comprising: logic, at least a portion of which is in hardware, the logic to select a first power offset value comprising a power offset value for a quadrature phase-shift keying (QPSK)-modulated cell radio network temporary identifier (C-RNTI)-based transmission over a physical downlink shared channel (PDSCH) of a cell served by the eNB, select a second power offset value comprising a power offset value for a quadrature amplitude modulation (QAM)-modulated transmission over the PDSCH of the cell served by the eNB, and send a radio resource control (RRC) connection control message containing a RadioResourceConfigDedicated field that comprises the first power offset value and the second power offset value.

Example 66 is the eNB of Example 65, the RadioResourceConfigDedicated field to comprise network-assisted interference cancellation and suppression (NAICS) assistance information that identifies the first power offset value.

Example 67 is the eNB of Example 66, the NAICS assistance information to be comprised in a subfield of the RadioResourceConfigDedicated field.

Example 68 is the eNB of Example 65, the logic to select the first power offset value and the second power offset value from among a common set of values.

Example 69 is the eNB of Example 65, the logic to select the first power offset value from among a defined set of values comprising −6 dB, −4.77 dB, −3 dB, −1.77 dB, 0 dB, 1 dB, 2 dB, and 3 dB.

Example 70 is the eNB of Example 65, the RRC connection control message to comprise an RRCConnectionSetup message, an RRCConnectionReestablishment message, or an RRCConnectionReconfiguration message.

Example 71 is the eNB of any of Examples 65 to 70, comprising: one or more radio frequency (RF) transceivers; and one or more RF antennas.

Example 72 is the eNB of Example 71, comprising at least one memory unit.

Example 73 is at least one non-transitory computer-readable storage medium comprising a set of instructions that, in response to being executed by user equipment (UE), cause the UE to: receive a radio resource control (RRC) connection control message; and perform a radio resource configuration procedure based on a RadioResourceConfigDedicated field comprised in the RRC connection control message, the RadioResourceConfigDedicated field to comprise network-assisted interference cancellation and suppression (NAICS) assistance information specifying a power offset value for quadrature phase-shift keying (QPSK)-modulated cell radio network temporary identifier (C-RNTI)-based transmissions to the UE over a physical downlink shared channel (PDSCH) of a serving cell of the UE.

Example 74 is the at least one non-transitory computer-readable storage medium of Example 73, the NAICS assistance information to be comprised within a subfield of the RadioResourceConfigDedicated field.

Example 75 is the at least one non-transitory computer-readable storage medium of Example 73, the RadioResourceConfigDedicated field to comprise information identifying a power offset value for quadrature amplitude modulation (QAM)-modulated transmissions to the UE over the PDSCH of the serving cell.

Example 76 is the at least one non-transitory computer-readable storage medium of Example 73, the power offset value to be comprised among a defined set of values comprising −6 dB, −4.77 dB, −3 dB, −1.77 dB, 0 dB, 1 dB, 2 dB, and 3 dB.

Example 77 is the at least one non-transitory computer-readable storage medium of Example 73, the RRC connection control message to comprise an RRCConnectionSetup message, an RRCConnectionReestablishment message, or an RRCConnectionReconfiguration message.

Example 78 is the at least one non-transitory computer-readable storage medium of Example 73, comprising instructions that, in response to being executed by the UE, cause the UE to apply one or more NACIS inter-cell interference mitigation algorithms based on the power offset value for QPSK-modulated C-RNTI-based transmissions to the UE over the PDSCH of the serving cell of the UE.

Example 79 is a wireless communication method, comprising: selecting, by processing circuitry at an evolved node B (eNB), a power offset value for a quadrature phase-shift keying (QPSK)-modulated cell radio network temporary identifier (C-RNTI)-based transmission over a physical downlink shared channel (PDSCH) of a cell served by the eNB; and sending a radio resource control (RRC) connection control message comprising network-assisted interference cancellation and suppression (NAICS) assistance information that identifies the selected power offset value.

Example 80 is the wireless communication method of Example 79, the NAICS assistance information to be comprised within a RadioResourceConfigDedicated field of the RRC connection control message.

Example 81 is the wireless communication method of Example 79, the power offset value to comprise a value for a power offset parameter that determines a ratio between a PDSCH energy per resource element (EPRE) and a cell-specific reference signal (CRS) EPRE.

Example 82 is the wireless communication method of Example 79, comprising selecting the power offset value for the QPSK-modulated C-RNTI-based transmission over the PDSCH and a power offset value for a quadrature amplitude modulation (QAM)-modulated transmission over the PDSCH from among a common set of values.

Example 83 is the wireless communication method of Example 79, comprising selecting the power offset value for the QPSK-modulated C-RNTI-based transmission over the PDSCH from among a defined set of values comprising −6 dB, −4.77 dB, −3 dB, −1.77 dB, 0 dB, 1 dB, 2 dB, and 3 dB.

Example 84 is the wireless communication method of Example 79, the RRC connection control message to comprise an RRCConnectionSetup message, an RRCConnectionReestablishment message, or an RRCConnectionReconfiguration message.

Example 85 is at least one non-transitory computer-readable storage medium comprising a set of instructions that, in response to being executed on a computing device, cause the computing device to perform a wireless communication method according to any of Examples 79 to 84.

Example 86 is an apparatus, comprising means for performing a wireless communication method according to any of Examples 79 to 84.

Example 87 is a system, comprising: an apparatus according to Example 86; one or more radio frequency (RF) transceivers; and one or more RF antennas.

Example 88 is the system of Example 87, comprising at least one memory unit.

Example 89 is user equipment (UE), comprising: means for receiving a radio resource control (RRC) connection control message comprising a RadioResourceConfigDedicated field, the RRC connection control message to comprise network-assisted interference cancellation and suppression (NAICS) assistance information that identifies a power offset value for one or more transmissions to the UE over a physical downlink shared channel (PDSCH) of a serving cell of the UE; and means for performing a radio resource configuration procedure in response to receipt of the RRC connection control message.

Example 90 is the UE of Example 89, the one or more transmissions to comprise quadrature phase-shift keying (QPSK)-modulated cell radio network temporary identifier (C-RNTI)-based transmissions.

Example 91 is the UE of Example 90, the RRC connection control message to comprise information identifying a power offset value for one or more quadrature amplitude modulation (QAM)-modulated transmissions to the UE over the PDSCH of the serving cell.

Example 92 is the UE of Example 89, the NAICS assistance information to be comprised within a subfield of the RadioResourceConfigDedicated field.

Example 93 is the UE of Example 89, the power offset value to be comprised among a defined set of values comprising −6 dB, −4.77 dB, −3 dB, −1.77 dB, 0 dB, 1 dB, 2 dB, and 3 dB.

Example 94 is the UE of Example 89, the RRC connection control message to comprise an RRCConnectionSetup message, an RRCConnectionReestablishment message, or an RRCConnectionReconfiguration message.

Example 95 is the UE of any of Examples 89 to 94, comprising: one or more radio frequency (RF) transceivers; and one or more RF antennas.

Example 96 is the UE of Example 95, comprising a touchscreen display.

Example 97 is a wireless communication method, comprising: receiving, at user equipment (UE), a radio resource control (RRC) connection control message; and performing, by processing circuitry of the UE, a radio resource configuration procedure based on a RadioResourceConfigDedicated field comprised in the RRC connection control message, the RadioResourceConfigDedicated field to comprise network-assisted interference cancellation and suppression (NAICS) assistance information specifying a power offset value for quadrature phase-shift keying (QPSK)-modulated cell radio network temporary identifier (C-RNTI)-based transmissions to the UE over a physical downlink shared channel (PDSCH) of a serving cell of the UE.

Example 98 is the wireless communication method of Example 97, the NAICS assistance information to be comprised within a subfield of the RadioResourceConfigDedicated field.

Example 99 is the wireless communication method of Example 97, the RadioResourceConfigDedicated field to comprise information identifying a power offset value for quadrature amplitude modulation (QAM)-modulated transmissions to the UE over the PDSCH of the serving cell.

Example 100 is the wireless communication method of Example 97, the power offset value to be comprised among a defined set of values comprising −6 dB, −4.77 dB, −3 dB, −1.77 dB, 0 dB, 1 dB, 2 dB, and 3 dB.

Example 101 is the wireless communication method of Example 97, the RRC connection control message to comprise an RRCConnectionSetup message, an RRCConnectionReestablishment message, or an RRCConnectionReconfiguration message.

Example 102 is the wireless communication method of Example 97, comprising applying one or more NACIS inter-cell interference mitigation algorithms based on the power offset value for QPSK-modulated C-RNTI-based transmissions to the UE over the PDSCH of the serving cell of the UE.

Example 103 is at least one non-transitory computer-readable storage medium comprising a set of instructions that, in response to being executed on a computing device, cause the computing device to perform a wireless communication method according to any of Examples 97 to 102.

Example 104 is an apparatus, comprising means for performing a wireless communication method according to any of Examples 97 to 102.

Example 105 is a system, comprising: an apparatus according to Example 104; one or more radio frequency (RF) transceivers; and one or more RF antennas.

Example 106 is the system of Example 105, comprising a touchscreen display.

Example 107 is an evolved node B (eNB), comprising: means for selecting a power offset value for a quadrature phase-shift keying (QPSK)-modulated cell radio network temporary identifier (C-RNTI)-based transmission over a physical downlink shared channel (PDSCH) of a cell served by the eNB; and means for sending a radio resource control (RRC) connection control message comprising network-assisted interference cancellation and suppression (NAICS) assistance information that identifies the selected power offset value.

Example 108 is the eNB of Example 107, the NAICS assistance information to be comprised within a RadioResourceConfigDedicated field of the RRC connection control message.

Example 109 is the eNB of Example 107, the power offset value to comprise a value for a power offset parameter that determines a ratio between a PDSCH energy per resource element (EPRE) and a cell-specific reference signal (CRS) EPRE.

Example 110 is the eNB of Example 107, comprising means for selecting the power offset value for the QPSK-modulated C-RNTI-based transmission over the PDSCH and a power offset value for a quadrature amplitude modulation (QAM)-modulated transmission over the PDSCH from among a common set of values.

Example 111 is the eNB of Example 107, comprising means for selecting the power offset value for the QPSK-modulated C-RNTI-based transmission over the PDSCH from among a defined set of values comprising −6 dB, −4.77 dB, −3 dB, −1.77 dB, 0 dB, 1 dB, 2 dB, and 3 dB.

Example 112 is the eNB of Example 107, the RRC connection control message to comprise an RRCConnectionSetup message, an RRCConnectionReestablishment message, or an RRCConnectionReconfiguration message.

Example 113 is the eNB of any of Examples 107 to 112, comprising: one or more radio frequency (RF) transceivers; and one or more RF antennas.

Example 114 is the eNB of Example 113, comprising at least one memory unit.

Example 115 is user equipment (UE), comprising: logic, at least a portion of which is in hardware, the logic to receive a radio resource control (RRC) connection control message comprising a RadioResourceConfigDedicated field and perform a radio resource configuration procedure in response to receipt of the RRC connection control message, the RRC connection control message to comprise network-assisted interference cancellation and suppression (NAICS) assistance information that identifies a power offset value for one or more transmissions to the UE over a physical downlink shared channel (PDSCH) of a serving cell of the UE.

Example 116 is the UE of Example 115, the one or more transmissions to comprise quadrature phase-shift keying (QPSK)-modulated cell radio network temporary identifier (C-RNTI)-based transmissions.

Example 117 is the UE of Example 116, the RRC connection control message to comprise information identifying a power offset value for one or more quadrature amplitude modulation (QAM)-modulated transmissions to the UE over the PDSCH of the serving cell.

Example 118 is the UE of Example 115, the NAICS assistance information to be comprised within a subfield of the RadioResourceConfigDedicated field.

Example 119 is the UE of Example 115, the power offset value to be comprised among a defined set of values comprising −6 dB, −4.77 dB, −3 dB, −1.77 dB, 0 dB, 1 dB, 2 dB, and 3 dB.

Example 120 is the UE of Example 115, the RRC connection control message to comprise an RRCConnectionSetup message, an RRCConnectionReestablishment message, or an RRCConnectionReconfiguration message.

Example 121 is the UE of any of Examples 115 to 120, comprising: one or more radio frequency (RF) transceivers; and one or more RF antennas.

Example 122 is the UE of Example 121, comprising a touchscreen display.

Example 123 is at least one non-transitory computer-readable storage medium comprising a set of instructions that, in response to being executed by an evolved node B (eNB), cause the eNB to: select a first power offset value comprising a power offset value for a quadrature phase-shift keying (QPSK)-modulated cell radio network temporary identifier (C-RNTI)-based transmission over a physical downlink shared channel (PDSCH) of a cell served by the eNB; select a second power offset value comprising a power offset value for a quadrature amplitude modulation (QAM)-modulated transmission over the PDSCH of the cell served by the eNB; and transmit a radio resource control (RRC) connection control message containing a RadioResourceConfigDedicated field that comprises the first power offset value and the second power offset value.

Example 124 is the at least one non-transitory computer-readable storage medium of Example 123, the RadioResourceConfigDedicated field to comprise network-assisted interference cancellation and suppression (NAICS) assistance information that identifies the first power offset value.

Example 125 is the at least one non-transitory computer-readable storage medium of Example 124, the NAICS assistance information to be comprised in a subfield of the RadioResourceConfigDedicated field.

Example 126 is the at least one non-transitory computer-readable storage medium of Example 123, comprising instructions that, in response to being executed by the eNB, cause the eNB to select the first power offset value and the second power offset value from among a common set of values.

Example 127 is the at least one non-transitory computer-readable storage medium of Example 123, comprising instructions that, in response to being executed by the eNB, cause the eNB to select the first power offset value from among a defined set of values comprising −6 dB, −4.77 dB, −3 dB, −1.77 dB, 0 dB, 1 dB, 2 dB, and 3 dB.

Example 128 is the at least one non-transitory computer-readable storage medium of Example 123, the RRC connection control message to comprise an RRCConnectionSetup message, an RRCConnectionReestablishment message, or an RRCConnectionReconfiguration message.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological

What is claimed is:

1. An evolved node B (eNB), comprising:
one or more radio frequency (RF) transceivers;
one or more RF antennas; and
circuitry to:
select a power offset value for a quadrature phase-shift keying (QPSK)-modulated cell radio network temporary identifier (C-RNTI)-based transmission to user equipment (UE) over a physical downlink shared channel (PDSCH) of a cell served by the eNB;
select a power offset value for a quadrature amplitude modulation (QAM)-modulated transmission to the UE over the PDSCH; and
generate a radio resource control (RRC) connection control message for transmission to the UE by the one or more RF antennas, the RRC connection control message comprising network-assisted interference cancellation and suppression (NAICS) assistance information that identifies the selected power offset value for the QPSK-modulated C-RNTI based transmission, the RRC connection control message to comprise information identifying the selected power offset value for the QAM-modulated transmission.

2. The eNB of claim 1, the NAICS assistance information to be comprised within a RadioResourceConfigDedicated field of the RRC connection control message.

3. The eNB of claim 1, the power offset value to comprise a value for a power offset parameter that determines a ratio between a PDSCH energy per resource element (EPRE) and a cell-specific reference signal (CRS) EPRE.

4. The eNB of claim 1, the logic to select the power offset value for the QPSK-modulated C-RNTI-based transmission over the PDSCH and the power offset value for the quadrature amplitude modulation QAM-modulated transmission over the PDSCH from among a common set of values.

5. The eNB of claim 1, the logic to select the power offset value for the QPSK-modulated C-RNTI-based transmission over the PDSCH from among a defined set of values comprising −6 dB, 31 4.77 dB, −3 dB, −1.77dB, 0 dB, 1 dB, 2 dB, and 3 dB.

6. The eNB of claim 1, the RRC connection control message to comprise an RRCConnectionSetup message, an RRCConnectionReestablishment message, or an RRCConnectionReconfiguration message.

7. User equipment (UE), comprising:
at least one radio frequency (RF) transceiver;
at least one RF antenna; and
circuitry to:
receive, from an evolved node B, a radio resource control (RRC) connection control message comprising a RadioResourceConfigDedicated field comprising:
network-assisted interference cancellation and suppression (NAICS) assistance information that identifies a power offset value for one or more quadrature phase-shift keying (QPSK)-modulated cell radio network temporary identifier (C-RNTI)-based transmissions from the eNB to the UE over a physical downlink shared channel (PDSCH) of a serving cell of the UE; and
information that identifies a power offset value for one or more quadrature amplitude modulation (QAM)-modulated transmissions from the eNB to the UE over the PDSCH of the serving cell of the UE;
perform a radio resource configuration procedure in response to receipt of the RRC connection control message; and
receive, via the at least one RF transceiver, the one or more QPSK-modulated C-RNTI based transmissions from the eNB over the PDSCH.

8. The UE of claim 7, the NAICS assistance information to be comprised within a subfield of the RadioResourceConfigDedicated field.

9. The UE of claim 7, the power offset value to be comprised among a defined set of values comprising −6 dB, −4.77 dB, 31 3dB, −1.77 dB, 0 dB, 1 dB, 2 dB, and 3 dB.

10. The UE of claim 7, the RRC connection control message to comprise an RRCConnectionSetup message, an RRCConnectionReestablishment message, or an RRCConnectionReconfiguration message.

11. The UE of claim 7, comprising a touchscreen display.

12. At least one non-transitory computer-readable storage medium having stored thereon instructions that, when executed by circuitry of an evolved node B (eNB), cause the eNB to:
select a first power offset value comprising a power offset value for a quadrature phase-shift keying (QPSK)-modulated cell radio network temporary identifier (C-RNTI)-based transmission to user equipment (UE) over a physical downlink shared channel (PDSCH) of a cell served by the eNB;
select a second power offset value comprising a power offset value for a quadrature amplitude modulation (QAM)-modulated transmission to user equipment (UE) over the PDSCH of the cell served by the eNB; and
transmit a radio resource control (RRC) connection control message to the UE, the RRC connection control message containing a RadioResourceConfigDedicated field that comprises the first power offset value and the second power offset value.

13. The at least one non-transitory computer-readable storage medium of claim 12, the RadioResourceConfigDedicated field to comprise network-assisted interference cancellation and suppression (NAICS) assistance information that identifies the first power offset value.

14. The at least one non-transitory computer-readable storage medium of claim 13, the NAICS assistance information to be comprised in a subfield of the RadioResourceConfigDedicated field.

15. The at least one non-transitory computer-readable storage medium of claim 12, comprising instructions that, in response to being executed by the eNB, cause the eNB to select the first power offset value and the second power offset value from among a common set of values.

16. The at least one non-transitory computer-readable storage medium of claim 12, comprising instructions that, in response to being executed by the eNB, cause the eNB to select the first power offset value from among a defined set of values comprising −6 dB, −4.77 dB, −3 dB, −1.77 dB, 0 dB, 1 dB, 2 dB, and 3 dB.

17. The at least one non-transitory computer-readable storage medium of claim 12, the RRC connection control message to comprise an RRCConnectionSetup message, an RRCConnectionReestablishment message, or an RRCConnectionReconfiguration message.

18. At least one non-transitory computer-readable storage medium having stored thereon instructions that, when executed by circuitry of user equipment (UE), cause the UE to:
- receive a radio resource control (RRC) connection control message from an evolved node B (eNB);
- perform a radio resource configuration procedure based on a RadioResourceConfigDedicated field comprised in the RRC connection control message, the RadioResourceConfigDedicated field to comprise:
  - network-assisted interference cancellation and suppression (NAICS) assistance information specifying a power offset value for quadrature phase-shift keying (QPSK)-modulated cell radio network temporary identifier (C-RNTI)-based transmissions from the eNB to the UE over a physical downlink shared channel (PDSCH) of a serving cell of the UE; and
  - information specifying a power offset value for quadrature amplitude modulation (QAM)-modulated transmissions from the eNB to the UE over the PDSCH of the serving cell of the UE; and
- receive, via the at least one RF transceiver, one or more QPSK-modulated C-RNTI based transmissions from the eNB over the PDSCH.

19. The at least one non-transitory computer-readable storage medium of claim 18, the NAICS assistance information to be comprised within a subfield of the RadioResourceConfigDedicated field.

20. The at least one non-transitory computer-readable storage medium of claim 18, the power offset value to be comprised among a defined set of values comprising −6 dB, −4.77 dB, −3 dB, −1.77 dB, 0 dB, 1 dB, 2 dB, and 3 dB.

21. The at least one non-transitory computer-readable storage medium of claim 18, the RRC connection control message to comprise an RRCConnectionSetup message, an RRCConnectionReestablishment message, or an RRCConnectionReconfiguration message.

22. The at least one non-transitory computer-readable storage medium of claim 18, comprising instructions that, in response to being executed by the UE, cause the UE to apply one or more NACIS inter-cell interference mitigation algorithms based on the power offset value for QPSK-modulated C-RNTI-based transmissions to the UE over the PDSCH of the serving cell of the UE.

* * * * *

UNITED STATES PATENT AND TRADEMARK OFFICE
CERTIFICATE OF CORRECTION

PATENT NO. : 10,211,960 B2
APPLICATION NO. : 15/791047
DATED : February 19, 2019
INVENTOR(S) : Alexei Davydov et al.

It is certified that error appears in the above-identified patent and that said Letters Patent is hereby corrected as shown below:

In the Claims

Claim 5 recites "31 4.77 dB" and it should instead read "-4.77 dB".

Claim 9 recites "31 3dB" and it should instead read "-3 dB".

Signed and Sealed this
Eleventh Day of April, 2023

Katherine Kelly Vidal
*Director of the United States Patent and Trademark Office*